(12) United States Patent
Huang et al.

(10) Patent No.: US 11,196,992 B2
(45) Date of Patent: Dec. 7, 2021

(54) METHOD AND APPARATUS OF NEURAL NETWORK BASED PROCESSING IN VIDEO CODING

(71) Applicant: MEDIATEK INC., Hsinchu (TW)

(72) Inventors: Yu-Wen Huang, Taipei (TW); Yu-Chen Sun, Keelung (TW); Tzu-Der Chuang, Zhubei (TW); Jian-Liang Lin, Su'ao Township, Yilan County (TW); Ching-Yeh Chen, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/754,694

(22) PCT Filed: Aug. 29, 2016

(86) PCT No.: PCT/CN2016/097134
§ 371 (c)(1),
(2) Date: Feb. 23, 2018

(87) PCT Pub. No.: WO2017/036370
PCT Pub. Date: Mar. 9, 2017

(65) Prior Publication Data
US 2018/0249158 A1    Aug. 30, 2018

Related U.S. Application Data

(60) Provisional application No. 62/214,121, filed on Sep. 3, 2015.

(51) Int. Cl.
*H04N 19/895*    (2014.01)
*H04N 19/105*    (2014.01)
(Continued)

(52) U.S. Cl.
CPC .............. *H04N 19/117* (2014.11); *G06N 3/04* (2013.01); *G06T 5/001* (2013.01); *H04N 19/182* (2014.11);
(Continued)

(58) Field of Classification Search
None
See application file for complete search history.

(56) References Cited

U.S. PATENT DOCUMENTS 5,418,895 A  *  5/1995  Lee ..................... H04N 1/6058
                                                       345/594
7,050,969 B2     5/2006  Raj et al.
(Continued)

FOREIGN PATENT DOCUMENTS

CA    2 917 631 A1    1/2015
CA    2 638 465 A1    2/2019
(Continued)

OTHER PUBLICATIONS

International Search Report dated Oct. 26, 2016, issued in application No. PCT/CN2016/097134.
(Continued)

*Primary Examiner* — Edemio Navas, Jr.
(74) *Attorney, Agent, or Firm* — Oblon, McClelland, Maier & Neustadt, L.L.P.

(57) ABSTRACT

A method and apparatus of video coding incorporating Deep Neural Network are disclosed. A target signal is processed using DNN (Deep Neural Network), where the target signal provided to DNN input corresponds to the reconstructed residual, output from the prediction process, the reconstruction process, one or more filtering processes, or a combination of them. The output data from DNN output is provided for the encoding process or the decoding process. The DNN can be used to restore pixel values of the target signal or to
(Continued)

predict a sign of one or more residual pixels between the target signal and an original signal. An absolute value of one or more residual pixels can be signalled in the video bitstream and used with the sign to reduce residual error of the target signal.

24 Claims, 5 Drawing Sheets

(51) Int. Cl.

| | |
|---|---|
| H04N 19/166 | (2014.01) |
| H04N 19/174 | (2014.01) |
| H04N 19/65 | (2014.01) |
| H04N 19/117 | (2014.01) |
| H04N 19/82 | (2014.01) |
| G06T 5/00 | (2006.01) |
| H04N 19/86 | (2014.01) |
| H04N 19/182 | (2014.01) |
| H04N 19/50 | (2014.01) |
| G06N 3/04 | (2006.01) |
| G06N 3/08 | (2006.01) |
| H04N 19/91 | (2014.01) |

(52) U.S. Cl.
CPC ............. *H04N 19/50* (2014.11); *H04N 19/82* (2014.11); *H04N 19/86* (2014.11); *G06N 3/0445* (2013.01); *G06N 3/0472* (2013.01); *G06N 3/08* (2013.01); *G06N 3/084* (2013.01); *G06N 3/088* (2013.01); *H04N 19/91* (2014.11)

(56) References Cited

U.S. PATENT DOCUMENTS

| | | | |
|---|---|---|---|
| 9,807,427 B2 | 10/2017 | Helle et al. | |
| 2009/0003458 A1 | 1/2009 | Au et al. | |
| 2009/0034622 A1* | 2/2009 | Huchet | H04N 19/176 |
| | | | 375/240.16 |
| 2013/0243104 A1* | 9/2013 | Chen | H04N 19/51 |
| | | | 375/240.29 |
| 2014/0257803 A1 | 9/2014 | Yu et al. | |
| 2014/0301641 A1* | 10/2014 | Zhong | H04N 19/91 |
| | | | 382/166 |
| 2015/0163509 A1* | 6/2015 | Hsu | H04N 19/583 |
| | | | 375/240.16 |
| 2015/0288963 A1* | 10/2015 | Sato | H04N 19/182 |
| | | | 375/240.14 |
| 2016/0021374 A1* | 1/2016 | Maruyama | H04N 19/11 |
| | | | 375/240.12 |
| 2018/0184123 A1* | 6/2018 | Terada | H04N 19/61 |

FOREIGN PATENT DOCUMENTS

| | | |
|---|---|---|
| CN | 101068366 A | 11/2007 |
| CN | 103703775 A | 4/2014 |
| CN | 104067613 A | 9/2014 |
| EP | 3 310 058 A1 | 4/2018 |
| KR | 10-2013-0007654 A | 1/2013 |
| KR | 10-2015-0035943 A | 4/2015 |

OTHER PUBLICATIONS

Tsai, C.Y., et al.; "Adaptive Loop Filtering for Video Coding;" IEEE Journal of Selected Topics in Signal Processing; vol. 7; No. 6; Dec. 2013; pp. 934-945.
Dong, C., et al.; "Compression Artifacts Reduction by a Deep Convolutional;" Apr. 27, 2015; pp. 1-10.
Park, W.S., et al.; "CNN-based in-loop filtering for coding efficiency improvement;" IEEE; Aug. 2016; pp. 1-6.
Dong, C., et al.; "Learning a Deep Convolutional Network for Image Super-Resolution;" Jan. 2014; pp. 1-16.
Office Action dated Jul. 27. 2020 in corresponding Indian Patent Application No. 201827012382 (with English Translation), 6 pages.

* cited by examiner

METHOD AND APPARATUS OF NEURAL NETWORK BASED PROCESSING IN VIDEO CODING

CROSS REFERENCE TO RELATED APPLICATIONS

The present invention claims priority to U.S. Provisional Patent Application, Ser. No. 62/214,121, filed on Sep. 3, 2015. The U.S. Provisional Patent Application is hereby incorporated by reference in its entirety.

TECHNICAL FIELD

The invention relates generally to video coding. In particular, the present invention relates to apply Deep Neural Network (DNN) in the coding system to a target signal, where the target signal provided to DNN input corresponds to the reconstructed residual, output from the prediction process, the reconstruction process or said at least one filtering process, or any combination of them.

BACKGROUND

Neural Network, also referred as an 'Artificial' Neural Network (ANN), is an information-processing system that has certain performance characteristics in common with biological neural networks. A Neural Network system is made up of a number of simple and highly interconnected processing elements to process information by their dynamic state response to external inputs. The processing element can be considered as a neuron in the human brain, where each perceptron accepts multiple inputs and computes weighted sum of the inputs. In the field of neural network, the perceptron is considered as a mathematical model of a biological neuron. Furthermore, these interconnected processing elements are often organized in layers. For recognition applications, the external inputs may correspond to patterns are presented to the network, which communicates to one or more middle layers, also called 'hidden layers', where the actual processing is done via a system of weighted 'connections'.

Artificial neural networks may use different architecture to specify what variables are involved in the network and their topological relationships. For example the variables involved in a neural network might be the weights of the connections between the neurons, along with activities of the neurons. Feed-forward network is a type of neural network topology, where nodes in each layer are fed to the next stage and there is connection among nodes in the same layer. Most ANNs contain some form of 'learning rule', which modifies the weights of the connections according to the input patterns that it is presented with. In a sense, ANNs learn by example as do their biological counterparts. Backward propagation neural network is a more advanced neural network that allows backwards error propagation of weight adjustments. Consequently, the backward propagation neural network is capable of improving performance by minimizing the errors being fed backwards to the neural network.

Deep multi-layer neural networks or deep neural networks (DNN) correspond to neural networks having many levels of interconnected nodes allowing them to compactly represent highly non-linear and highly-varying functions. Nevertheless, the computational complexity for DNN grows rapidly along with the number of nodes associated with the large number of layers. Until recently, some computationally efficient methods to train such deep networks were developed. Among them, Hinton et al. proposed a greedy layer-wise unsupervised learning procedure relying on the training algorithm of restricted Boltzmann machines (RBM) to initialize the parameters of a deep belief network (DBN) (Hinton et al. "A fast learning algorithm for deep belief nets", *Neural Computation*, vol. 18, pp 1527-1554, 2006). Another a greedy layer-wise unsupervised learning procedure was proposed by Bengio et al. ("Greedy layer-wise training of deep networks", *Advances in Neural Information Processing Systems* 19, Editors: Schölkopf et al., pp 153-160, MIT Press, 2007). Yet another efficient training algorithm was developed by Ranzato et al. ("Efficient learning of sparse representations with an energy-based model", *Advances in Neural Information Processing Systems* 19, Editors: Schölkopf et al., pp 153-160, MIT Press, 2007).

Upon the breakthroughs in speeding up the training of DNN, the DNN has been successfully applied to various complex tasks such as speech recognition, image segmentation, object detection, facial recognition, etc. With the success of DNN in various fields, it is desirable to explore the potential of applying DNN to video coding. In particular, it is desirable to further improve the performance of emerging new video coding standards such as High Efficiency Video Coding (HEVC).

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). The CTU is further partitioned into multiple coding units (CUs) to adapt to various local characteristics. HEVC supports multiple Intra prediction modes and for Intra coded CU, the selected Intra prediction mode is signalled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

Figure 1A:
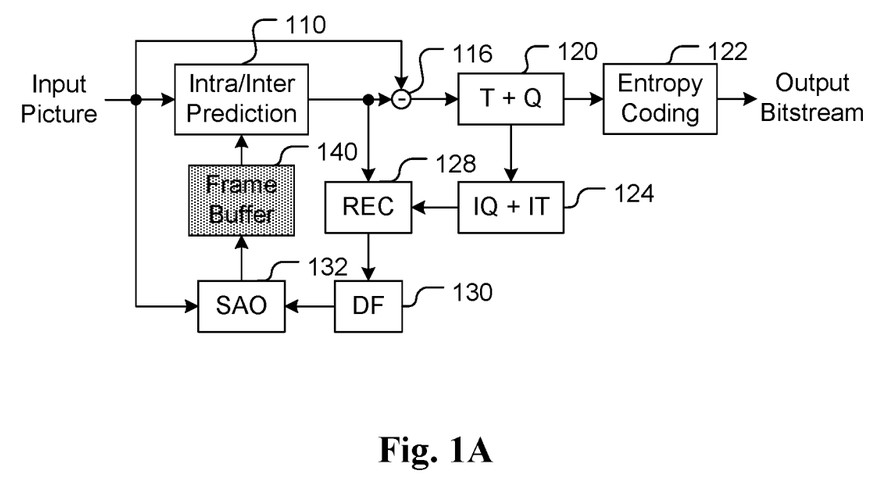
FIG. 1A illustrates an exemplary adaptive Intra/Inter video encoder based on the High Efficiency Video Coding (HEVC) standard.

FIG. 1A illustrates an exemplary adaptive Intra/Inter video encoder based on HEVC. The Intra/Inter Prediction unit 110 generates Inter prediction based on Motion Estimation (ME)/Motion Compensation (MC) when Inter mode is used. The Intra/Inter Prediction unit 110 generates Intra prediction when Intra mode is used. The Intra/Inter prediction data (i.e., the Intra/Inter prediction signal) is supplied to the subtractor 116 to form prediction errors, also called residues or residual, by subtracting the Intra/Inter prediction signal from the signal associated with the input picture. The process of generating the Intra/Inter prediction data is referred as the prediction process in this disclosure. The prediction error (i.e., residual) is then processed by Transform (T) followed by Quantization (Q) (T+Q, 120). The transformed and quantized residues are then coded by Entropy coding unit 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Since a reconstructed picture may be used as a reference picture for Inter prediction, a reference picture or pictures have to be reconstructed at the encoder end as well. Consequently, the transformed and quantized residues are processed by Inverse Quantization (IQ) and Inverse Transformation (IT) (IQ+IT, 124) to recover the residues. The reconstructed residues are then added back to Intra/Inter prediction data at Reconstruction unit (REC) 128 to reconstruct video data. The process of adding the reconstructed residual to the Intra/Inter prediction signal is referred as the reconstruction process in this disclosure. The output picture from the reconstruction process is referred as the reconstructed picture. In order to reduce artefacts in the reconstructed picture, in-loop filters including Deblocking Filter (DF) 130 and Sample Adaptive Offset (SAO) 132 are used. The filtered reconstructed picture at the output of all filtering processes is referred as a decoded picture in this disclosure. The decoded pictures are stored in Frame Buffer 140 and used for prediction of other frames.

Figure 1B:
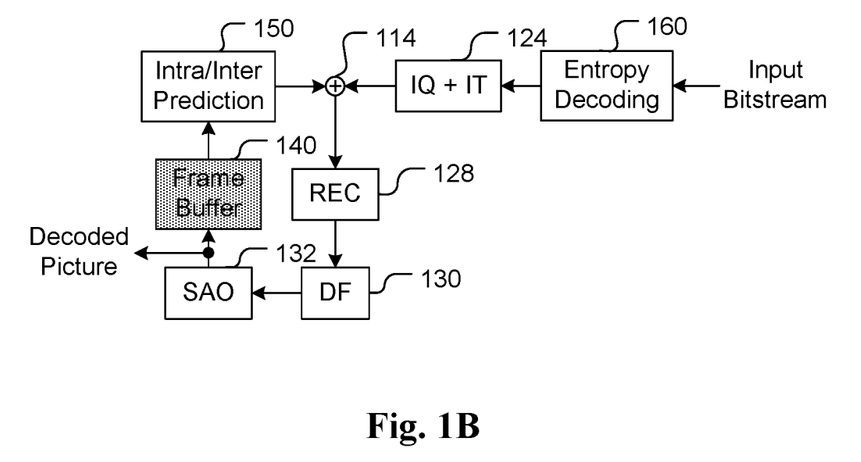
FIG. 1B illustrates an exemplary adaptive Intra/Inter video decoder based on the High Efficiency Video Coding (HEVC) standard.

FIG. 1B illustrates an exemplary adaptive Intra/Inter video decoder based on HEVC. Since the encoder also contains a local decoder for reconstructing the video data, some decoder components are already used in the encoder except for the entropy decoder. At the decoder side, an Entropy Decoding unit 160 is used to recover coded symbols or syntaxes from the bitstream. The process of generating the reconstructed residual from the input bitstream is referred as a residual decoding process in this disclosure. The prediction process for generating the Intra/Inter prediction data is also applied at the decoder side, however, the Intra/Inter prediction unit 150 is different from that in the encoder side since the Inter prediction only needs to perform motion compensation using motion information derived from the bitstream. Furthermore, an Adder 114 is used to add the reconstructed residues to the Intra/Inter prediction data.

Figure 2A:
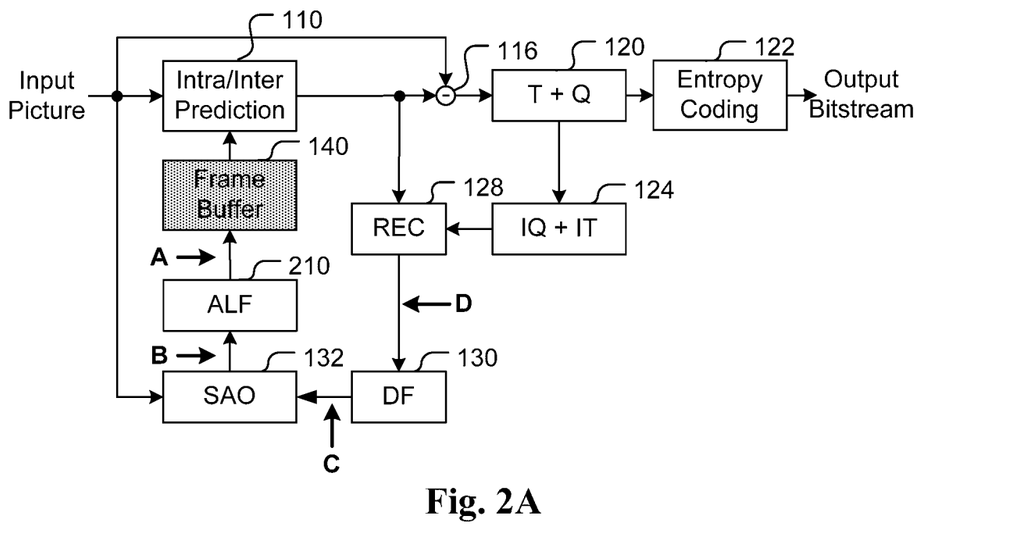
FIG. 2A illustrates an exemplary adaptive Intra/Inter video encoder similar to that in FIG. 1A with an additional ALF process.

During the development of the HEVC standard, another in-loop filter, called Adaptive Loop Filter (ALF), is also disclosed, but not adopted into the main standard. The ALF can be used to further improve the video quality. For example, ALF 210 can be used after SAO 132 and the output from ALF 210 is stored in the Frame Buffer 140 as shown in FIG. 2A for the encoder side and FIG. 2B at the decoder side. For the decoder side, the output from the ALF 210 can also be used as decoder output for display or other processing. In this disclosure, deblocking filter, SAO and ALF are all referred as a filtering process.

SUMMARY

A method and apparatus of video encoding or decoding incorporating Deep Neural Network are disclosed. According to this method, a target signal is processed using DNN (Deep Neural Network), where the target signal provided to DNN input corresponds to the reconstructed residual, output from the prediction process, the reconstruction process, one or more filtering processes, or a combination of them. At the encoder side, the output data from DNN output is provided for the encoding process. At the decoder side, the output data from DNN output is provided for the decoding process. The DNN can be used to restore pixel values of the target signal or to predict a sign of one or more residual pixels between the target signal and an original signal. An absolute value of one or more residual pixels can be signalled in the video bitstream and used with the sign to reduce residual error of the target signal.

The filtering processes may comprise a deblocking filter, SAO (Sample Adaptive Offset), ALF (Adaptive Loop Filter), and any combination of them. The target signal provided to the DNN input may correspond to the output from the reconstruction process, the deblocking filter, SAO, or ALF. On the other hand, the output data from DNN output can be provided as a decoded picture or provided as input to the deblocking filter, SAO, or ALF.

The parameters of the DNN can be pre-defined for the video coding system. Furthermore, multiple sets of DNN parameters can be used for the video coding system to select. The selection among the multiple sets of DNN parameters can be determined from the video bitstream or implicitly decided at the decoder. The selection among the multiple sets of DNN parameters can be determined from the video bitstream in a sequence level, picture level, slice level, CTU (Coding Tree Unit) level or CU (Coding Unit) level. Furthermore, an on/off control flag can be used to indicate whether the DNN is enabled or not.

In one embodiment, the DNN may have multiple DNN inputs including the reconstructed residual as one DNN input. For example, the multiple DNN inputs correspond to the reconstructed residual and the prediction signal, and the DNN provides the reconstructed picture as the DNN output for the filtering process.

In a block-based coding, the neighbouring samples for the DNN process may not available. The unavailable samples may be generated by padding or the DNN process is not used. Each picture may also be partitioned into regions so that the coding process with DNN can be applied to multiple regions in parallel. For unavailable samples near region boundaries, the unavailable samples can be generated by padding.

In yet another embodiment, the target signal is associated with multiple pictures. The multiple pictures are aligned prior to processing target signal using DNN. In this case, pixels from corresponding units of the multiple pictures are aligned based on motion information related to the corresponding units of the multiple pictures.

In still yet another embodiment, when the pictures comprise different colour components, processing target signal using DNN may process the different colour components jointly or independently.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Among different image restoration or processing methods, neural network based methods, in particular the deep neural network (DNN) has been found promising in recent years. It has been applied to image de-noising, image super-resolution, and various other complex image processing tasks. In various studies, the DNN has been shown to achieve a better performance compared to traditional image processing methods. Accordingly, in the present invention, the DNN is utilized as an image restoration method for video coding in order to improve the subjective quality or coding efficiency.

Figure 2B:
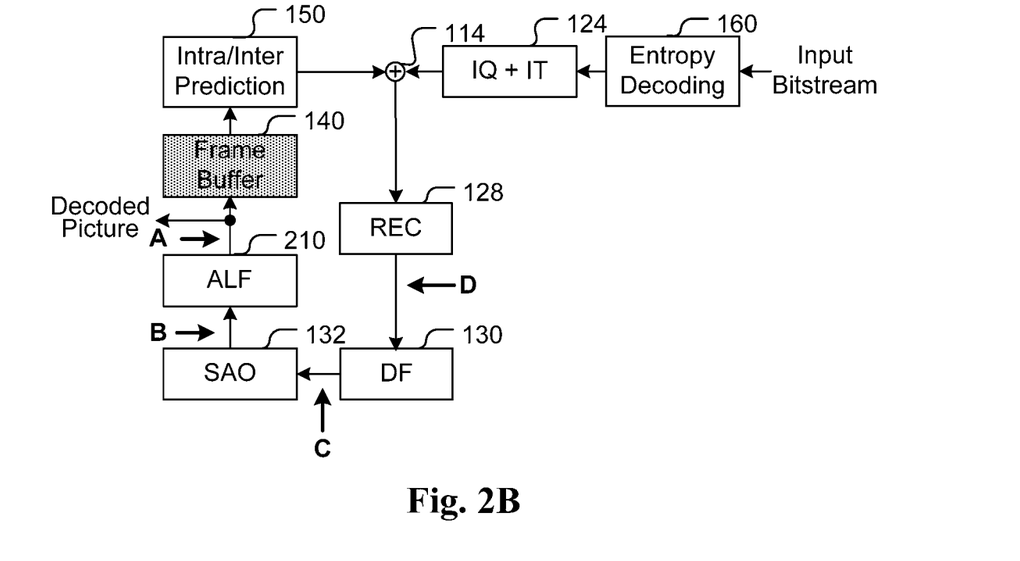
FIG. 2B illustrates an exemplary adaptive Intra/Inter video decoder similar to that in FIG. 1B with an additional ALF process.

According to the present invention, the DNN is utilized as an image restoration technique in the video coding system. The present invention also discloses another type of DNN application, where the DNN is used as a classifier to classify underlying pixels into different classes. Alternatively, the DNN is used for making a pixel-wise in-loop filter on/off decision for each in-loop filter enabled region. The DNN can be applied to a point in the video coding chain where the video signal is subject to distortion. For example, the DNN can be applied to the output of ALF (labelled as point A) in the encoder as well as in the decoder as shown in FIG. 2A and FIG. 2B respectively. The DNN can be applied after SAO (labelled as point B), DF (labelled as point C), or REC (labelled as point D), with or without other restoration methods in one video coding system, as shown in FIG. 2A and FIG. 2B. When DNN is used for signal restoration, the DNN output is provided to the next stage. For example, in the case of DNN at signal point A in FIG. 2A and FIG. 2B, the DNN input corresponds to the output from ALF 210 and the DNN output is stored in the Frame Buffer 140. In the case of DNN at signal point B, the DNN input corresponds to the output from SAO 132 and the DNN output is provided to ALF 210. The signals that the DNN is processing may correspond to different types of signals such as reconstructed picture (point D), DF processed (point C), SAO processed (point B) and ALF processed (point A) as shown in the example of FIGS. 2A and 2B. For convenience, the signal to be processed by the DNN is referred as a target signal in this disclosure.

Figure 3:
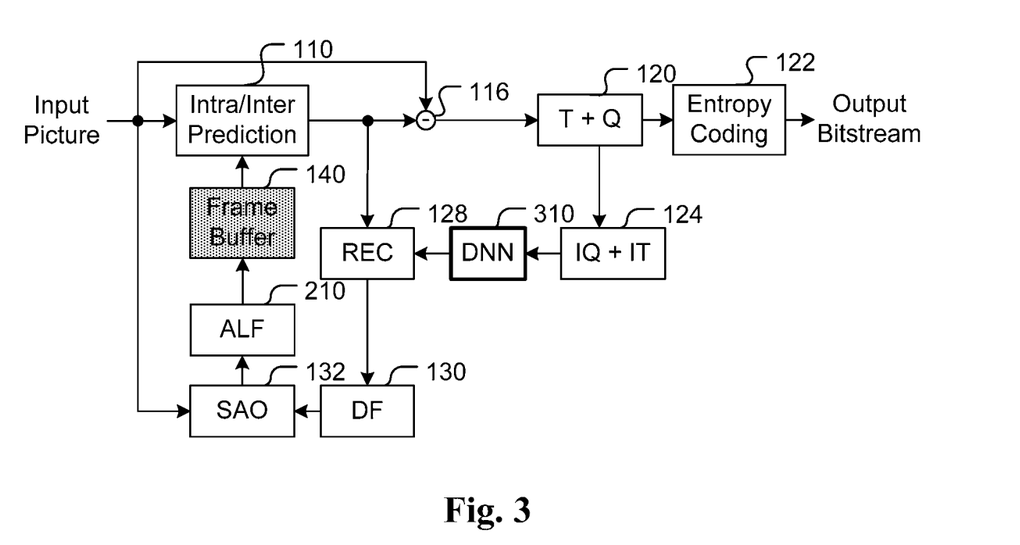
FIG. 3 illustrates an exemplary video encoder according to one embodiment of the present invention, where the Deep Neural network (DNN) is applied to the residual signal.

According to another embodiment of the present invention, the DNN is applied to the reconstructed residual signals. For example, for the encoder in FIG. 2A, the DNN 310 can be applied to the reconstructed residual from IQ+IT 124 as shown in FIG. 3. In this case, the target signal corresponds to the output from IQ+IT 124 (i.e., the reconstructed residual). The reconstructed residual after restoration by the DNN is provided to the reconstruction process (i.e., REC 128) to generate a reconstructed picture.

Figure 4:
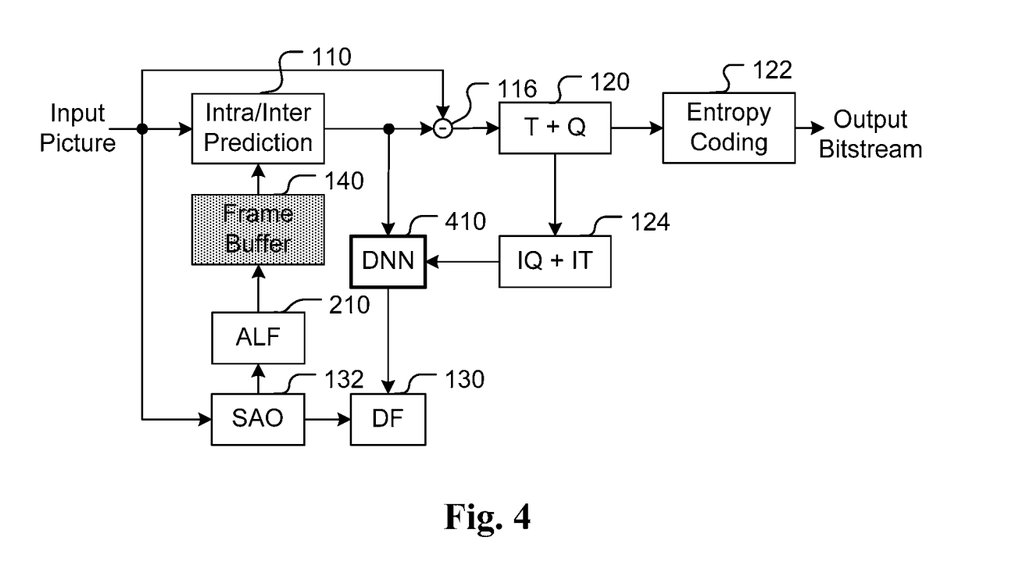
FIG. 4 illustrates an exemplary video encoder according to one embodiment of the present invention, where the Deep Neural network (DNN) has multiple inputs including the residual signal.

According to yet another embodiment of the present invention, the DNN can use multiple inputs. One of the inputs can be the reconstructed residual. For example, the Intra/Inter prediction signal and the reconstructed residual signal both are the inputs for DNN 410 and the output is the DNN filtered reconstructed pixels as shown in FIG. 4. In this case, the DNN is also used for the reconstruction process (i.e., to restore the reconstructed pixels directly). The reconstructed picture from the DNN is provided to DF 130 for further processing.

As mentioned before, there are lots of parameters or variables in DNN, such as the number of layers or depth, filter coefficients, filter footprints, non-linear operations, and so on. These parameters used by the decoder should be the same as these used by the encoder. These parameters may have to be signalled from the encoder to the decoder. In order to reduce the side information of DNN, some pre-defined parameters can be standardized in the video coding system. Therefore, no additional information needs to be coded in the output bitstream.

However, in order to adapt to the characteristics of variant input pictures, more than one set of pre-defined parameters can be supported in a video coding system. The selection of pre-defined parameter sets can be explicitly signalled to the decoder or implicitly decided at decoder. The explicit selection can be signalled at a sequence level, picture level, slice level, CTU (Coding Tree Unit)-row level, CTU level, or CU (Coding Unit) level. The implicit selection can be dependent on the slice type, quantization parameter, prediction mode, quantized coefficients, reconstructed residual, predictors, reconstructed pixels, or motion information.

Beside the pre-defined parameters, the DNN parameters also can be signalled in the bitstream to generalize this framework. The parameters can be coded at sequence level, picture level, slice level, CTU-row level, CTU level or CU level. Moreover, an on/off control flag for indicating whether to enable the DNN can be signalled to the decoder to further improve the performance of this framework. The on/off control flag can be signalled at the sequence level, picture level, slice level, CTU-row level, CTU level or CU level. In another embodiment, the DNN parameters can be adaptively updated on-the-fly based on the transmission bit stream. For example, the final reconstructed pixels of coded pictures can be used as the training data to update the DNN parameters on-the-fly for the successively coded pictures.

In another embodiment, the DNN is applied after REC, DF, SAO, or ALF to predict the sign of one or more residual pixels between the target signal and original signal. This residual is different from the residual generated by subtracting the Intra/Inter prediction data from the original input picture (i.e., output from subtractor 116 in FIG. 2A). The residual here, referred as second residual for clarity, refers to the difference between a signal in the coding chain and its corresponding original signal. For example, the second residual at the output of the reconstruction process (i.e., REC 128) correspond to the difference between the output of the reconstruction process and the original input picture. In another example, the second residual at the output of the SAO 132 correspond to the difference between the output of the SAO 132 and the output of the DF 130. An absolute value is further transmitted and combined with the sign predicted by DNN to reduce the residual error for a pixel or a group of pixels. The method can be in-loop or out-loop process. If the method is out-loop, a decoder can optionally apply the method. An encoder will not use the restored frame to predict following frames. Therefore, if a decoder does not apply the method for a frame, mismatch between the encoder and the decoder will not propagate to following frames as a result of not applying the method.

In still another embodiment, the DNN is applied after DF, SAO, ALF or other in-loop filters to determine whether the pixels within an in-loop filter enabled region should be modified by the in-loop filter. For example, the DNN can be applied to the output of SAO 132 in the encoder as well as in the decoder as shown in FIG. 2A and FIG. 2B respectively. When SAO 132 is enabled for a current CTU, the DNN is used for determining whether each pixel in the current CTU should be modified by SAO 132. According to the decision made by the DNN, some pixels in the current CTU may remain the same pixel intensity as that outputted by DF 130, whereas the other pixels in the current CTU may be modified by SAO 132.

The major process of DNN is similar to filtering in essence. Therefore, for those pixels at picture boundaries, there are some unavailable pixels required for the DNN process. There are two solutions to solve this problem. One is to apply padding techniques to generate the corresponding pixels. The padding technique can be nearest pixel copy, odd mirroring, or even mirroring. The other is to skip the DNN process for these pixels. Moreover, in order to achieve the parallel processing of DNN, similar padding techniques can be applied to some pre-defined regions which can be processed by the DNN in parallel. The pre-defined region can be one picture, one slice, one CTU row, one CTU, one coding unit, one prediction unit, one transform unit, or one block. The pre-defined region can be signalled to the decoder. The parallel processing of DNN also can be enabled or disabled by one coded flag that is at sequence level, picture level, slice level, or CTU-row level.

In another embodiment, the inputs of DNN can be pixels from multiple frames, named as multi-frames DNN in this disclosure. When multi-frames DNN is applied, the input pixels from multiple frames can be aligned with motion information, first. The precision of the alignment can be integer- or fractional-sample accuracy. The corresponding unit can be one frame, one slice, one CTU row, one CTU, one coding unit, one prediction unit, one transform unit, one pre-defined block, or one pixel. The related motion information can be translational model, isotropic model, affine model, perspective model, parabolic model, or other high-order polynomial motion model. The motion information coded in the bitstream can be reused to perform the alignment when multi-frames DNN is used.

In another embodiment, when DNN is applied on video coding, different colour components can be processed in one DNN system together or processed independently. Moreover, the DNN can be applied to the luminance part first. The luminance part is then used to modify the chrominance or the chrominance can be skipped, directly. The bit-depth of one DNN system can be dependent on the bit-depth of input pixels.

Figure 5:
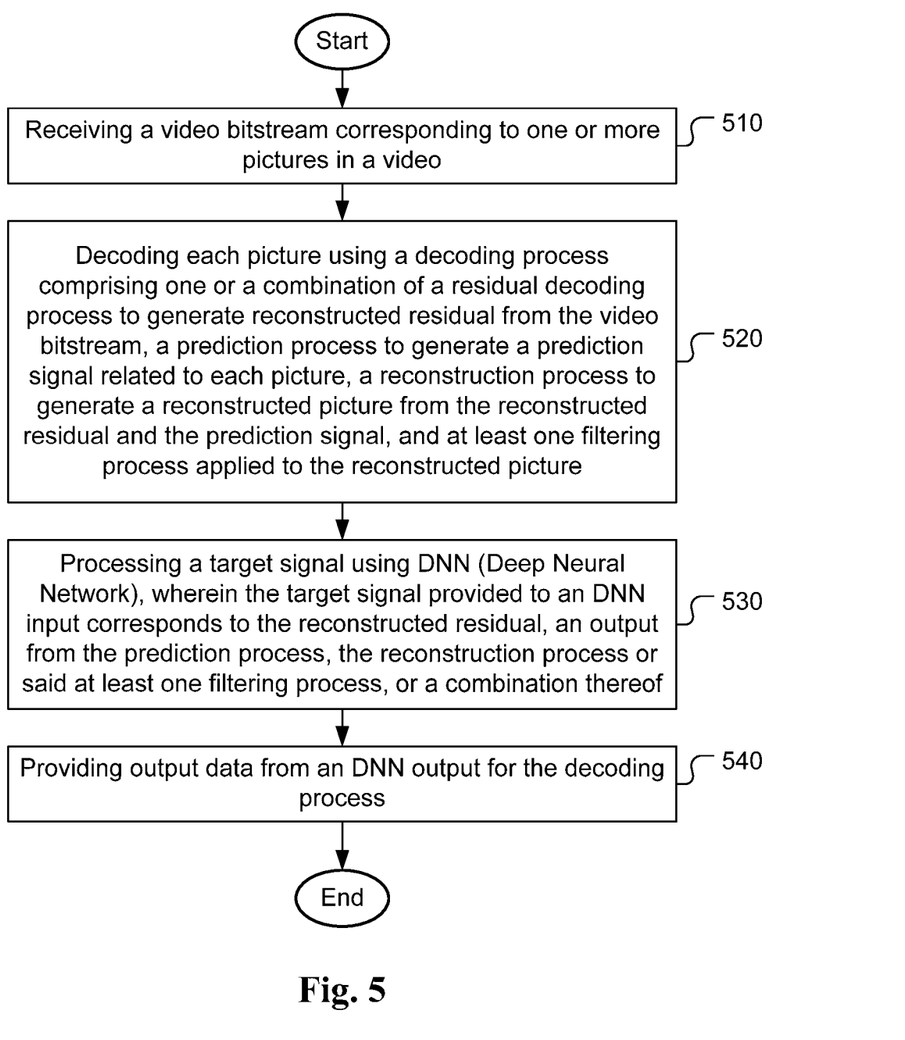
FIG. 5 illustrates an exemplary flowchart of a video decoder incorporating the Deep Neural network (DNN) according to one embodiment of the present invention.

FIG. 5 illustrates an exemplary flowchart of a video decoder incorporating the Deep Neural network (DNN) according to one embodiment of the present invention. The method receives a video bitstream corresponding to one or more pictures in a video sequence in step 510. Each picture is decoded using a decoding process comprising one or a combination of a residual decoding process to generate reconstructed residual from the video bitstream, a prediction process to generate a prediction signal related to each picture, a reconstruction process to generate reconstructed picture from the reconstructed residual and the prediction signal, and at least one filtering process applied to the reconstructed picture in step 520. Target signal is processed using DNN (Deep Neural Network) in step 530, where the target signal provided to DNN input corresponds to the reconstructed residual, output from the prediction process, the reconstruction process or said at least one filtering process, or a combination thereof. The output data from DNN output is provided for the decoding process in step 540.

Figure 6:
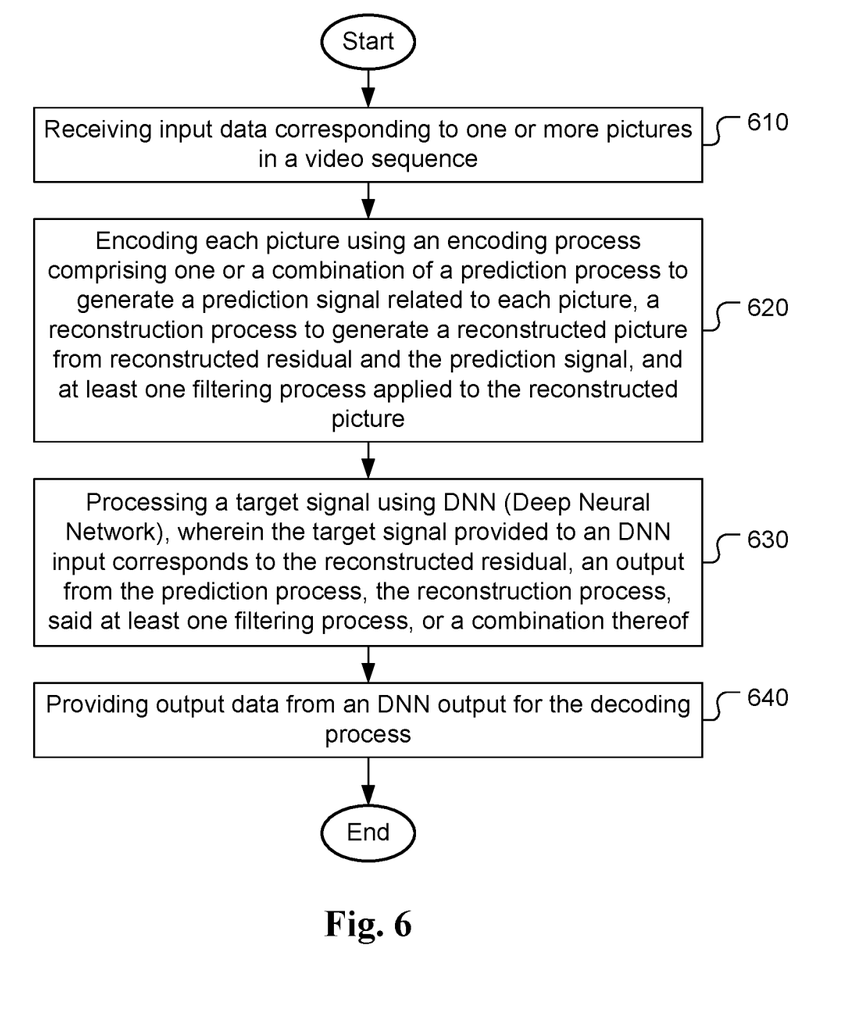
FIG. 6 illustrates an exemplary flowchart of a video encoder incorporating the Deep Neural network (DNN) according to one embodiment of the present invention.

FIG. 6 illustrates an exemplary flowchart of a video encoder incorporating the Deep Neural network (DNN) according to one embodiment of the present invention. The method receives input data corresponding to one or more pictures in a video sequence in step 610. Each picture is encoded using an encoding process comprising one or a combination of a prediction process to generate a prediction signal related to each picture, a reconstruction process to generate reconstructed picture from reconstructed residual and the prediction signal, and at least one filtering process applied to the reconstructed picture in step 620. Target signal using DNN (Deep Neural Network) is processed in step 630, where the target signal provided to DNN input corresponds to the reconstructed residual, output from the prediction process, the reconstruction process or said at least one filtering process, or a combination thereof. The output data from DNN output is provided for the encoding process in step 640.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding for a video decoder, the method comprising:
   receiving a video bitstream corresponding to one or more pictures in a video sequence; and
   decoding each picture using a decoding process comprising a residual decoding process to generate a reconstructed residual from the video bitstream, a prediction process to generate a prediction signal related to each picture, a reconstruction process to generate a reconstructed picture from the reconstructed residual and the prediction signal, a restoration process to generate a restored picture from the reconstructed picture, and at least one filtering process applied to the restored picture to generate a decoded picture for output,
   wherein
   the at least one filtering process comprises either a deblocking filtering process, or the deblocking filtering process and one or more of an SAO (Sample Adaptive Offset) filtering process and an ALF (Adaptive Loop Filter) filtering process, and
   the restoration process comprises:
      performing a DNN (Deep Neural Network) process to process pixel values of the reconstructed picture corresponding to target pixels of a target block and to generate output values for the target pixels of the target block, respectively; and
      generating pixel values of the restored picture corresponding to the target pixels of the target block according to the generated output values.

2. The method of claim 1, wherein the output values generated by the performing the DNN process are set as the pixel values of the restored picture corresponding to the target pixels of the target block.

3. The method of claim 1, wherein
   the restoration process further comprises receiving difference values of the target pixels of the target block from the video bitstream,
   the output values generated by the performing the DNN process indicate signs for applying the difference values to the respective target pixels of the target block, and
   the generating the pixel values of the restored picture corresponding to the target pixels of the target block comprises combining, according to the signs for applying the difference values, the difference values and the pixel values of the reconstructed picture corresponding to the target pixels of the target block.

4. The method of claim 1, wherein DNN parameters for the DNN process are pre-defined for the video decoder.

5. The method of claim 4, wherein multiple sets of DNN parameters are available for the video decoder to select.

6. The method of claim 5, wherein selection among the multiple sets of DNN parameters is determined from the video bitstream or implicitly decided at the video decoder.

7. The method of claim 6, wherein the selection among the multiple sets of DNN parameters is determined from the video bitstream in a sequence level, picture level, slice level, CTU (Coding Tree Unit) level or CU (Coding Unit) level.

8. The method of claim 6, wherein the selection among the multiple sets of DNN parameters is decided at the video decoder, the selection is dependent on a slice type, quantization parameter, prediction mode, quantized coefficients, the reconstructed residual, predictors, reconstructed pixels, motion information, or any combination thereof.

9. The method of claim 1, wherein DNN parameters for the DNN process are determined from the video bitstream.

10. The method of claim 9, wherein the DNN parameters are determined from the video bitstream in a sequence level, picture level, slice level, CTU (Coding Tree Unit)-row level, CTU level or CU (Coding Unit) level.

11. The method of claim 1, wherein an on/off control flag is used to indicate whether the DNN process is enabled or not.

12. The method of claim 11, wherein the on/off control flag is determined from the video bitstream in a sequence level, picture level, slice level, CTU (Coding Tree Unit)-row level, CTU level or CU (Coding Unit) level.

13. The method of claim 1, wherein
   the one or more pictures comprise different colour components, and
   the pixel values of the reconstructed picture to be processed by the DNN process correspond to the different colour components jointly or independently.

14. The method of claim 1, wherein a bit depth for performing the DNN process is dependent on a bit depth of the target pixels.

15. The method of claim 1, wherein
   the pixel values of the reconstructed picture to be processed by the DNN process correspond to at least a luminance component of the target pixels, and
   the output values correspond to a chrominance component of the target pixels.

16. An apparatus for video decoding in a video decoder, the apparatus comprising one or more electronics or processors configured to:
   receive a video bitstream corresponding to one or more pictures in a video sequence; and
   decode each picture using a decoding process comprising a residual decoding process to generate a reconstructed residual from the video bitstream, a prediction process to generate a prediction signal related to each picture, a reconstruction process to generate a reconstructed picture from the reconstructed residual and the prediction signal, a restoration process to generate a restored picture from the reconstructed picture, and at least one filtering process applied to the restored picture to generate a decoded picture for output,
   wherein
   the at least one filtering process comprises either a deblocking filtering process, or the deblocking filtering process and one or more of an SAO (Sample Adaptive Offset) filtering process and an ALF (Adaptive Loop Filter) filtering process, and
   the restoration process comprises:
      performing a DNN (Deep Neural Network) process to process pixel values of the reconstructed picture corresponding to target pixels of a target block and to generate output values for the target pixels of the target block, respectively; and generating pixel values of the restored picture corresponding to the target pixels of the target block according to the generated output values.

17. A method of video encoding for a video encoder, the method comprising:
receiving input data corresponding to one or more pictures in a video sequence; and
encoding each picture using an encoding process comprising a prediction process to generate a prediction signal related to each picture, a reconstruction process to generate a reconstructed picture from a reconstructed residual and the prediction signal, a restoration process to generate a restored picture from the reconstructed picture, and at least one filtering process applied to the restored picture to generate a decoded picture for a subsequent prediction process,
wherein
the at least one filtering process comprises either a deblocking filtering process, or the deblocking filtering process and one or more of an SAO (Sample Adaptive Offset) filtering process and an ALF (Adaptive Loop Filter) filtering process, and
the restoration process comprises:
performing a DNN (Deep Neural Network) process to process pixel values of the reconstructed picture corresponding to target pixels of a target block and to generate output values for the target pixels of the target block, respectively; and
generating pixel values of the restored picture corresponding to the target pixels of the target block according to the generated output values.

18. The method of claim 17, wherein the output values generated by the performing the DNN process are set as the pixel values of the restored picture corresponding to the target pixels of the target block.

19. The method of claim 17, wherein
the restoration process further comprises receiving difference values of the target pixels of the target block,
the output values generated by the performing the DNN process indicate signs for applying the difference values to the respective target pixels of the target block, and
the generating the pixel values of the restored picture corresponding to the target pixels of the target block comprises combining, according to the signs for applying the difference values, the difference values and the pixel values of the reconstructed picture corresponding to the target pixels of the target block.

20. The method of claim 17, wherein
DNN parameters for the DNN process are selected from multiple sets of DNN parameters, and
selection of the DNN parameters is signaled via a video bitstream generated by the video encoder or implicitly derived.

21. The method of claim 20, wherein the selection of the DNN parameters is signaled via the video bitstream in a sequence level, picture level, slice level, CTU (Coding Tree Unit) level, or CU (Coding Unit) level.

22. The method of claim 20, wherein the selection of the DNN parameters is derived based on a slice type, quantization parameter, prediction mode, quantized coefficients, the reconstructed residual, predictors, reconstructed pixels, motion information, or any combination thereof.

23. The method of claim 17, wherein a bit depth for performing the DNN process is dependent on a bit depth of the target pixels.

24. An apparatus for video encoding in a video encoder, the apparatus comprising one or more electronics or processors configured to:
receive input data corresponding to one or more pictures in a video sequence; and
encode each picture using an encoding process comprising a prediction process to generate a prediction signal related to each picture, a reconstruction process to generate a reconstructed picture from a reconstructed residual and the prediction signal, a restoration process to generate a restored picture from the reconstructed picture, and at least one filtering process applied to the restored picture to generate a decoded picture for a subsequent prediction process,
wherein
the at least one filtering process comprises either a deblocking filtering process, or the deblocking filtering process and one or more of an SAO (Sample Adaptive Offset) filtering process and an ALF (Adaptive Loop Filter) filtering process, and
the restoration process comprises:
performing a DNN (Deep Neural Network) process to process pixel values of the reconstructed picture corresponding to target pixels of a target block and to generate output values for the target pixels of the target block, respectively; and
generating pixel values of the restored picture corresponding to the target pixels of the target block according to the generated output values.

* * * * *